United States Patent
Du et al.

(10) Patent No.: US 8,200,241 B2
(45) Date of Patent: Jun. 12, 2012

(54) TERMINAL RANDOM ACCESS METHOD FOR CELLULAR RADIO COMMUNICATIONS SYSTEM AND METHOD FOR GENERATING GROUP IDENTIFIER

(75) Inventors: Zhongda Du, Shenzhen (CN); Peng Hao, Shenzhen (CN); Junfeng Zhang, Shenzhen (CN); Bin Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 227 days.

(21) Appl. No.: 12/667,387

(22) PCT Filed: Sep. 3, 2008

(86) PCT No.: PCT/CN2008/072256
§ 371 (c)(1),
(2), (4) Date: Dec. 31, 2009

(87) PCT Pub. No.: WO2009/039749
PCT Pub. Date: Apr. 2, 2009

(65) Prior Publication Data
US 2010/0178933 A1 Jul. 15, 2010

(30) Foreign Application Priority Data

Sep. 24, 2007 (CN) .......................... 2007 1 0161518
Sep. 24, 2007 (CN) .......................... 2007 1 0161519

(51) Int. Cl.
*H04W 88/02* (2009.01)
(52) U.S. Cl. .................................................. 455/456.1
(58) Field of Classification Search .................. 455/458, 455/459, 455.1, 436–450; 370/329, 331, 370/294, 338, 456.1, 335, 458; 711/118
See application file for complete search history.

(56) References Cited

U.S. PATENT DOCUMENTS
2007/0206531 A1 9/2007 Pajukoski
(Continued)

FOREIGN PATENT DOCUMENTS
CN 1968511 A 5/2007
(Continued)

OTHER PUBLICATIONS

English Translation of the Written Opinion of the International Search Authority in international application No. PCT/CN2008/072256, mailed on Dec. 11, 2008.

(Continued)

*Primary Examiner* — Diane Mizrahi
(74) *Attorney, Agent, or Firm* — Oppedahl Patent Law Firm LLC

(57) ABSTRACT

A terminal random access method for a cellular radio communications system and a method for generating a group identifier are provided. In the terminal random access method for a cellular radio communications system, random access preamble message is transmitted by a terminal to a base station in a random access time slot in a radio frame; location information of the random access time slot in the radio frame and that in the frequency domain are combined to generate a group identifier and sending a random access response message to the terminal after adding the group identifier and an individual identifier that corresponds to the random access preamble message to the random access response message by the base station; it is judged whether the random access response message that corresponds to the sent random access preamble message is received, by judging whether the group identifier and the individual identifier within the received random access response message are all expected values.

16 Claims, 4 Drawing Sheets

U.S. PATENT DOCUMENTS

| | | | |
|---|---|---|---|
| 2009/0239545 A1* | 9/2009 | Lee et al. | 455/450 |
| 2010/0067495 A1* | 3/2010 | Lee et al. | 370/335 |
| 2010/0178895 A1* | 7/2010 | Maeda et al. | 455/404.1 |
| 2010/0238872 A1* | 9/2010 | Kim et al. | 370/329 |
| 2011/0058572 A1* | 3/2011 | Du et al. | 370/458 |

FOREIGN PATENT DOCUMENTS

| | | |
|---|---|---|
| CN | 101128062 A | 2/2008 |
| CN | 101128063 A | 2/2008 |

OTHER PUBLICATIONS

International Search Report in international application No. PCT/CN2008/072256, mailed Dec. 11, 2008.

3GPP TS36.300 v8.1.0:"Evolved Universal Terrestrial Radio Access (E-UTRA) and Evolved Universal Terrestrial Radio Access Network (E-UTRAN); Overall description"; Jun. 2007 see section 10.1.5 [retrieved on Nov. 24, 2008] retrieved from Internet: <http://www.3gpp.org/ftp/specs/html-info/36300.htm>.

Huawei, Discussion of RACH Response, 3GPP TSG RAN2 #59 Tdoc R2-073173, 2007.

Nokia,Nokia Siemens Networks, Stage 3 topics of Random Access Procedure,3GPP TSG-RAN WG2 Meeting #58bis R2-072409, (2007).

3GPP TS 36.321 VO.I.2(Jun. 2007),R2-073473.

Supplementary European Search Report in European application No. 08800768.7, mailed on Nov. 3, 2011.

Initial Random Access Procedure for E-UTRAN, Oct. 5, 2006.

Medium Access Control (MAC) protocol specification, Sep. 1, 2007.

*RA-RNTI* vs. *C-RNTI* for non-contention based random access, Aug. 15, 2007.

CR for Dedicated Preamble Assignment, Nov. 13, 2008.

* cited by examiner

TERMINAL RANDOM ACCESS METHOD FOR CELLULAR RADIO COMMUNICATIONS SYSTEM AND METHOD FOR GENERATING GROUP IDENTIFIER

TECHNICAL FIELD

The present invention relates to a cellular radio communications system, especially to a terminal random access method for a cellular radio communications system and a method for generating a group identifier.

BACKGROUND

As shown in FIG. 1, a cellular radio communications system 100 is mainly composed of terminals 101, base stations and a core network 103. The network composed of base stations is called a Radio Access Network (RAN), which is responsible for non-access stratum transactions, such as radio resource management. Physical or logical connections may exist between base stations according to practical situations, for example, between base station 102A and base station 102B or base station 102C as shown in FIG. 1. Every base station can be connected with one or more than one core network 103 (CN) nodes. Each CN is responsible for non-access stratum affairs such as location update, etc., moreover, for the update of the anchor point on the user side. The terminal 101 are all sorts of devices that can communicate with cellular radio communications networks, such as a mobile telephone or a laptop computer, etc.

The cellular radio communications system 100 is identified with radio frames as the basic unit in terms of system time, and each radio frame is numbered with what is called a System Frame Number (SFN). The terminal 101 can get the start of the radio frame by cell search, thereby acquiring the downlink time synchronization. In cellular radio communications systems such as in a Universal Mobile Telecommunications System (UMTS) and a Long Term Evolution (LTE) system, the length of a radio frame is 10 milliseconds (ms). Different cellular radio communications systems may have different frame structures of radio frames, and a radio frame usually comprises an integer number of subframes. When getting the downlink synchronization, the terminal 101 may get to know the location of the current subframe within the current radio frame. As shown in FIG. 2, in an LTE system, a TYPE1 radio frame 200 comprises 10 subframes and each subframe comprises 2 time slots. Such a frame structure is usable for Frequency Division Duplex (FDD) and High Chip Rate Time Division Duplexing (HCR TDD); as shown in FIG. 3, a TYPE2 radio frame 300 comprises 2 subframes and each subframe comprises 7 time slots and an interval time slot between the first two time slots. Such a frame structure is applicable for Low Chip Rate Time Division Duplexing (LCR TDD). In some cellular radio communications systems the unit at a lower level in the radio frames is called a time slot. For example, in FDD system of Wide band Code Division Multiple Access (WCDMA), there are 15 time slots in a radio frame. The random access time slot as the term is used herein means the subframe or a time slot or a time slot in a subframe at a lower level in a radio frame of a cellular radio communications system 100. As to the TYPE1 radio frame in the LTE system, the random access time slot is usually a 1 ms-long subframe; as to the TYPE2 radio frame in LTE system, the random access time slot is usually a 5 ms-long time slot in a subframe. However, exceptions exist. For the purpose of broad coverage, the random access time slot in the LTE system may occupy 2 or 3 subframes or time slots, and these random access preambles are sometimes called extended pulse; while in LCR TDD, a kind of short random access preamble can be adopted in very small cells, and such preamble is shorter than common time slots. One random access time slot occupies a bandwidth of 6 radio Resource Blocks (RB) in a frequency domain.

In an existing LTE system, the procedure of a terminal randomly accessing to a cellular radio communications system comprises the following three steps:

a. a terminal sends a random access preamble message to a base station in a certain random access time slot in a radio frame;

b. the base station returns a random access response message to the terminal, terminal and the message comprises at least the uplink radio resource;

c. the terminal sends a message in the uplink radio resource allocated for the terminal by the base station.

In step a, it may happen that one or more than one terminals send random access preamble messages to the base station in the same random access time slot. These random access preamble messages may be different from one another, or the same with one another which means that the same random access preamble pseudo random code is adopted. The base station can identify the random access preamble messages adopting different pseudo random codes in the same random access time slot, but cannot identify the random access preamble messages adopting the same pseudo random code.

In step b, the random access response message may comprise response information responding to one or more than one random access preamble messages. These random access preamble messages are sent from the same random access time slot. The operation, combining possible more than one random access response messages in one response message, is mainly to increase the utilization rate of radio resources during the random access procedure. In order to identify the random access response message by the terminal the base station will add a temporary group identifier to the message, and a corresponding relation exists between the group identifier and the random access time slot. Meanwhile, the random access response message also comprises an individual identifier corresponding to the random access preamble message itself, which is usually the index number of the random access preamble in the random access preamble set in the cell in which the random access preamble is located. The method for setting a group identifier is predefined in the protocol. When a certain terminal sends a random access preamble message to the base station, the terminal already knows the expected values of the group identifier and the individual identifier in the random access response message that the terminal will receive.

In order to maintain certain flexibility of the random access response procedure, the random access response message is asynchronous with the random access preamble message in a time domain, i.e., there is no fixed relation between the two messages in the time domain; on the contrary, it is allowed to send random access response messages within one time window. Meanwhile, for increasing the flexibility of radio resource scheduling, the base station, in order to respond to random access preamble messages received in a certain random access time slot, can send random access response messages corresponding to the above-mentioned random access preamble messages at one or more Transmission Time Interval (TTI) within the above time window. A start time of the time window is related to how fast the base station processes the random access preamble messages, and an end time thereof is related to the load of the base station processing random access preamble messages, the radio resources scheduled to random access response messages and other factors.

In step c, after receiving one random access response message within the specified time window, the terminal verifies whether the message comprises the expected group identifier first, which is usually included in the physical control channel; if the message comprises the expected group identifier, the terminal verifies whether the message further comprises an individual identifier corresponding to the sent random access preamble message; if the expected individual identifier is included, it can be determined that current random access response message corresponds to the sent random access preamble message. Afterward, the terminal sends a message in the uplink radio resource allocated for the terminal by the base station in step b according to practical demand. The sent message could be a request of layer 3 for establishing radio connection, a switch response, a scheduling request, or an uplink synchronization request, etc.

In the existing published technology, methods of setting group identifiers in step b are provided. Generally, a group identifier can be computed according to the absolute locations of random access time slots in system time as well as those in the frequency domain in these methods, so that the group identifier is unique within a specified time period.

SUMMARY

The present invention aims to solve the technical problem by providing a terminal random access method for a cellular radio communications system and a method for generating a group identifier, so that a terminal can gain access to a cellular radio communications system fast and accurately.

The technical scheme adopted in the present invention is that: a terminal random access method for cellular radio communications system comprises the following steps:

a terminal sends a random access preamble message to a base station in a random access time slot in a radio frame;

the base station combines location information of the random access time slot in the radio frame and that in the frequency domain to generate a group identifier, and after adding the group identifier and an individual identifier that corresponds to the random access preamble message to a random access response message, sends the random access response message to the terminal; and the terminal determines whether the random access response message corresponding to the sent random access preamble is received, by determining whether the group identifier and the individual identifier in the received random access response message are both expected values.

Further, the uplink radio resource may be included in the random access response message allocated for the terminal by the base station; and the expected value of the individual identifier is the identification number of the random access preamble which is sent by the terminal.

Further, before any step is taken, the terminal already may know the usable random access time slot, and may combine the location information of the random access time slot in the radio frame in which the random access time slot is located and that in the frequency domain to generate the expected group identifier.

Further, a method for combining the location information of the random access time slot in the radio frame and that in the frequency domain may comprise: the manner of general indexing or the manner of coding respectively and then combining.

Further, the location information of the random access time slot in the frequency domain may be located at the high bit of the coding of the group identifier.

Further, when the location information of the random access time slot in the radio frame is a relative location, the relative location may be the relative serial number of the random access time slot among one or more random access time slots in the radio frame;

when the location information of the random access time slot in the radio frame is an absolute location, the absolute location may be the number of the random access time slot in the radio frame.

Further, the location information of the random access time slot in the frequency domain may be a relative location of a random access channel in the frequency domain: if just one random access channel is configured in a cell, the location of the random access time slot in the frequency domain is set to be 0; if a plurality of random access channels are configured in a cell, when a frequency hopping strategy is not adopted, the relative locations of the random access channels in the frequency domain are set to be the serial numbers in ascending or descending order of the frequency bands occupied by different random access channels within current cell carrier bandwidth; when the frequency hopping strategy is adopted, the relative locations of the random access channels in the frequency domain are set to be the serial numbers in ascending or descending order of the frequency bands occupied by initial locations of the random access channels in frequency-domain within current cell carrier bandwidth.

Further, the location information of the random access time slot in the frequency domain may be the order of the appearance of the random access channels in the signaling.

The present invention also provides a terminal random access method for cellular radio communications system, comprising the following steps:

a terminal sends a random access preamble message to a base station in a random access time slot in a radio frame;

the base station takes the location information of the random access time slot in the radio frame as a group identifier, adds the group identifier together with an individual identifier that corresponds to the random access preamble message to a random access response message, and sends the random access response message to the terminal; and the terminal determines whether the random access response message corresponding to the sent random access preamble is received, by determining whether the group identifier and the individual identifier in the received random access response message are both expected values.

Further, the uplink radio resource may be comprised in the random access response message allocated for the terminal by the base station;

the expected value of the individual identifier may be the identification number of the random access preamble sent by the terminal.

Further, before any step is taken, the terminal may already know the usable random access time slot, and may take the location information of the random access time slot in the radio frame in which the random access time slot is located as the expected group identifier.

Further, when the location information of the random access time slot in the radio frame is a relative location, the relative location may be the relative serial number of the random access time slot among one or more random access time slots in the radio frame;

when the location information of the random access time slot in the radio frame is an absolute location, the absolute location may be the number of the random access time slot in the radio frame.

The present invention also provides a method for generating a group identifier, applied in the procedure of a terminal random access to a cellular radio communications system, comprising the following steps:

after receiving a random access preamble message sent by a terminal, a base station determines location information of the random access time slot in which the random access preamble message is located in the radio frame and location information of the random access time slot in the frequency domain; and the base station combines the above two pieces of location information to generate a group identifier.

Further, a method for combining the location information of the random access time slot in the radio frame and the location information thereof in the frequency domain may include: the manner of general indexing or the manner of coding respectively and then combining.

Further, the location information of the random access time slot in the frequency domain may be located at the high bit of the coding of the group identifier.

Further, when the location information of the random access time slot in the radio frame is a relative location, the relative location may be the relative serial number of the random access time slot among one or more random access time slots in the radio frame;

when the location information of the random access time slot in the radio frame is an absolute location, the absolute location may be the number of the random access time slot in the radio frame.

Further, the location of the random access time slot in the frequency domain may be a relative location of a random access channel in the frequency domain: if just one random access channel is configured in a cell, the location of the random access time slot in the frequency domain is set to be 0; if a plurality of random access channels are configured in a cell, when a frequency hopping strategy is not adopted, the relative locations of the random access channels in the frequency domain are set to be the serial numbers in ascending or descending order of the frequency bands occupied by different random access channels within current cell carrier bandwidth; when the frequency hopping strategy is adopted, the relative locations of the random access channels in the frequency domain are set to be the serial numbers in ascending or descending order of the frequency bands occupied by initial locations of the random access channels in frequency-domain within current cell carrier bandwidth.

Further, the location information of the random access time slot in the frequency domain may be the order of the appearance of the random access channels in the signaling.

The present invention also provides a method for generating a group identifier, applied in the procedure of a terminal randomly accessing to a cellular radio communications system, comprising the following steps:

after receiving a random access preamble message sent by a terminal, a base station determines location information of the random access time slot in which the random access preamble message being located in the radio frame in which the random access time slot being located; and the base station takes the location information as a group identifier.

Further, when the location information of the random access time slot in the radio frame is a relative location, the relative location may be the relative serial number of the random access time slot among one or more random access time slots in the radio frame;

when the location information of the random access time slot in the radio frame is an absolute location, the absolute location may be the number of the random access time slot in the radio frame.

Before starting a random access, a terminal always knows the configuration of random access time slots in the time domain (i.e. in a radio frame) and that in the frequency domain according to the description information of the obtained random access radio resources. By adopting the present invention, the group identifier in a random access response message can be determined without depending upon the reading of SFN, which is very important for the random access procedure during the switching procedure. In addition, it allows simple and easy operation to set a group identifier in the same way whether the configuration of a random access time slot changes or not.

DETAILED DESCRIPTION

After researching on the terminal random access method for a cellular radio communications system and the method for generating a group identifier in the existing technology, several problems have been found as follows:

First, a terminal needs to get an absolute system time of the cellular system in which the random access time slot is located, and the absolute system time thereof is usually an SFN. In practical application, for example, the terminal may be unable to get the SFN of the target cellular system in advance during the switching procedure and therefore cannot compute the group identifier, in order to obtain the SFN of the target cellular system, extra delay and system processing, e.g., reading the system message, are needed because the SFN is usually broadcast in a system message. Another disadvantage is that it is difficult to define a fixed time range to make the group identifier unique in a practical radio communications system, because the configuration of random access channels is flexible. If the time range is notified by a system message broadcast for example, the flexibility of the system configuration may be improved, but it also means that the terminal has to read the parameter every time it starts a request for random access, and since the period of system message broadcast is usually long, it will extend the time for the terminal to access to a cellular system. Another problem is that the method of adopting an absolute location in the frequency domain may lead to redundancy of an information bit of a group identifier because, generally, not all uplink radio resources will be set as random access resources in a TTI; moreover, if an uplink random access channel adopts a method such as frequency hopping, the absolute location will change with time, which adds to the complexity and likelihood of error in group identifier coding.

Figure 1:
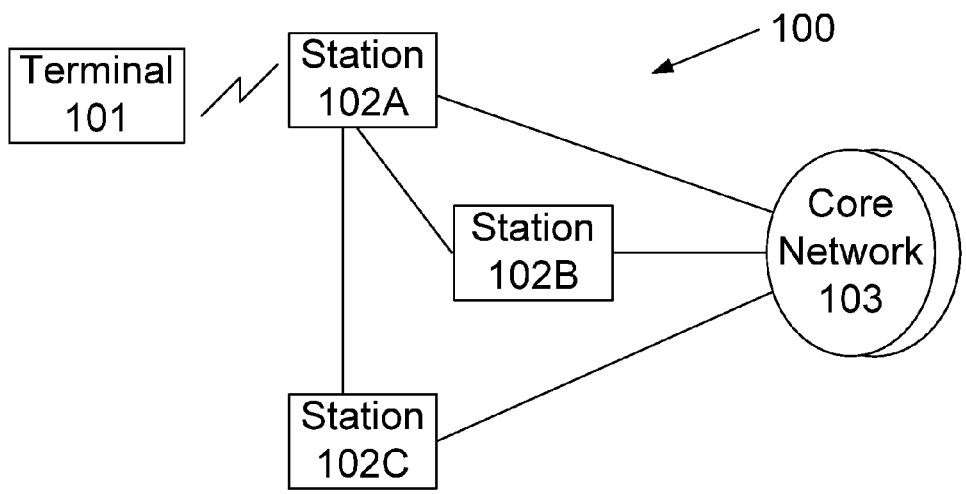
FIG. 1 is a diagram illustrating the structure of a cellular radio communications system 100 in the existing technology.
Figure 2:
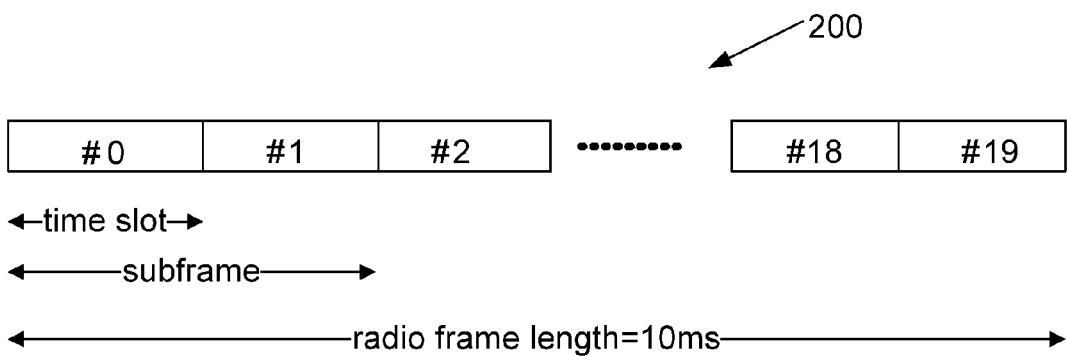
FIG. 2 is a diagram illustrating the structure of a TYPE1 radio frame 200 in LTE in the existing technology.
Figure 3:
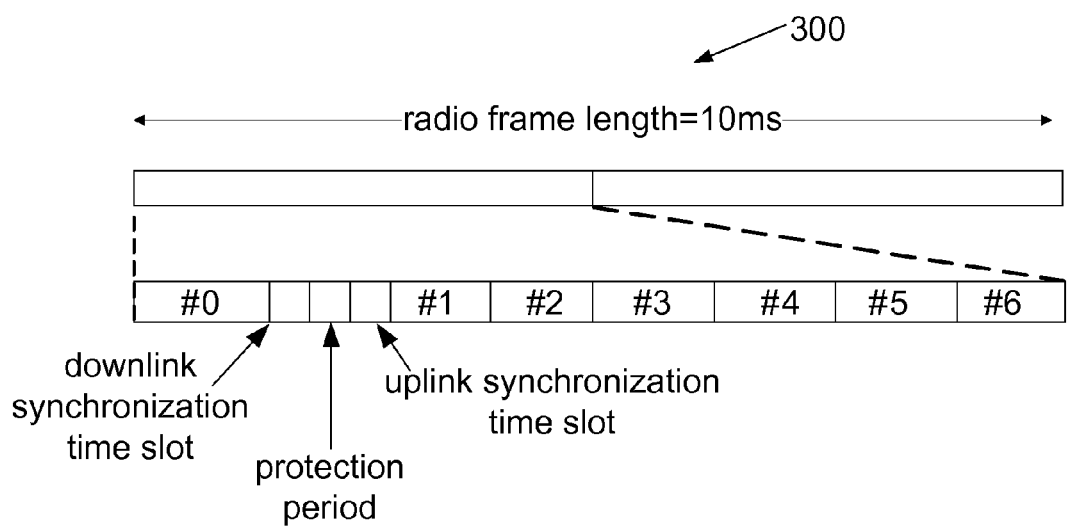
FIG. 3 is a diagram illustrating the structure of a TYPE2 radio frame 300 in LTE in the existing technology.
Figure 4:
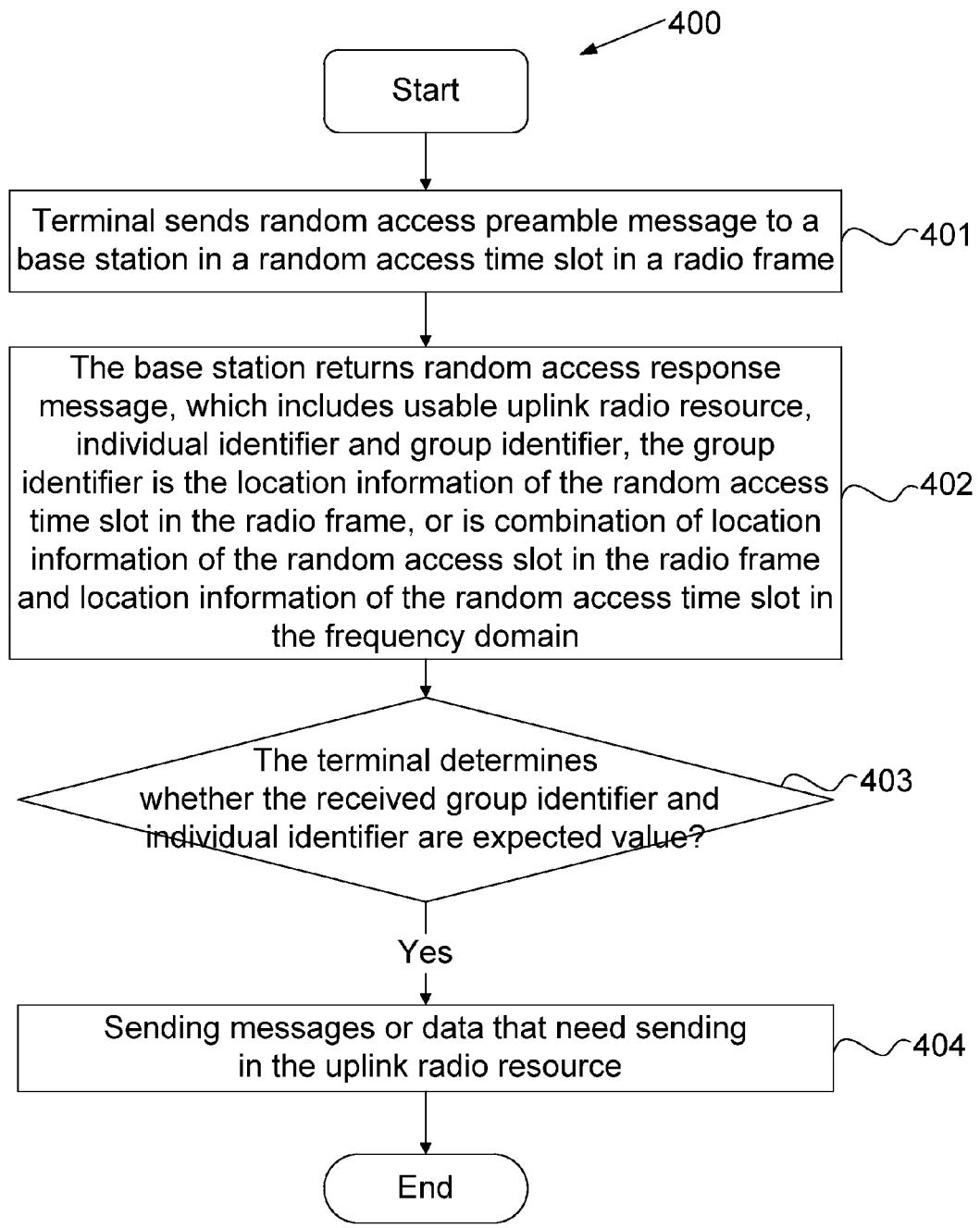
FIG. 4 is a flowchart illustrating the terminal random access to a cellular radio communications system 400 in embodiments of the present invention.

Based on the above analysis, the technical scheme of the present invention is provided, as shown in FIG. 4, the procedure of a terminal random access to a radio communication system, comprising the following steps:

401. a terminal sends a random access preamble message to a base station in a certain random access time slot in a radio frame;

402. the base station returns a random access response message, which comprises the uplink radio resource allocated for the above terminal and an individual identifier that corresponds to the random access preamble message; the physical control channel comprises a group identifier that is Random Access-Radio Network Temporary Identity (RA-RNTI), the base station combines location information of the random access time slot in the radio frame in which the random access time slot is located and that in the frequency domain to generate a group identifier, or the base station directly takes location information of the random access time slot in the radio frame in which the random access time slot is located as a group identifier;

403. after receiving the random access response message, the terminal determines whether the RA-RNTI and the individual identifier are both expected values by comparing the two identifiers comprised in the received random access response message and the two existing locally;

404. if the two identifiers are both the expected values, it means that the terminal receives the expected random access response message, and the terminal sends messages or data that need sending in the uplink radio resource allocated for the terminal by the base station in step b.

Before step a, i.e. before the terminal starts a random access, the random access radio resources (i.e. possibly one or more random access time slots) and the RA-RNTIs corresponding to the random access time slots are known, one RA-RNTI thereof is mapped to the location information of one random access time slot in the radio frame in which the random access time slot is located, or is mapped to both the location information of one random access time slot in the radio frame in which the random access time slot is located and the location information thereof in the frequency domain at the same time.

In step b, there are two methods for generating the group identifier, specifically:

Method 1: after receiving the random access preamble message sent by the terminal, the base station determines the location information of the random access time slot in the radio frame in which the random access preamble message is located as well as the location information thereof in the frequency domain; and then the base station takes the coding of the above two pieces of location information as a group identifier to add to the random access response message.

Method 2: after receiving the random access preamble message sent by the terminal, the base station determines the location information of the random access time slot in which the random access preamble message is located in the radio frame in which the random access time slot is located; and the base station takes the number of the location information as a group identifier to add to the random access response message.

The location of the random access time slot in the radio frame in which the random access time slot is located can be a relative location, or an absolute location. The relative location can be a relative serial number of a random access time slot among more random access time slots in a radio frame in which the random access time slot is located, while the absolute location can be a number of a random access time slot in a radio frame in which the random access time slot is located. For example, 10 subframes are included in a radio frame and 3 random access time slots are configured, supposing that the numbers of the subframes in which the 3 random access time slots are located are 0, 3 and 6 respectively. If the serial number starts from 0, the relative locations of the 3 random access time slots are 0, 1 and 2, and the absolute locations thereof are 0, 3 and 6 respectively.

In method 1, the location in the frequency domain is a relative location of a random access channel in the frequency domain. If one random access channel is configured in a cell, the location in the frequency domain can simply be set as 0; otherwise the relative serial numbers can be distinguished according to the practical configuration of the random access channels in the frequency domain. If a frequency hopping strategy is not adopted, the relative serial numbers can simply be set to be the serial numbers in ascending or descending order of the frequency bands occupied by different random access channels within current cell carrier bandwidth; when the frequency hopping strategy is adopted, the relative serial numbers can be set to be the serial numbers in ascending or descending order of the frequency bands occupied by different random access channels at frequency-domain initial locations within current cell carrier bandwidth. There is another method in which, whether the frequency hopping strategy is adopted or not, locations in the frequency domain are defined according to the order of the appearance of random access channels in a signaling (e.g. in a system message).

For example, the bandwidth of a cell is 10 MHz, and at most 8 random access channels (supposing that each random access channel occupies a bandwidth of 1.25 MHz) can be configured. Now 2 random access channels A and B are configured, according to the method of taking ascending order in the frequency domain, the absolute locations of A and B in the frequency domain are locations where the first 1.25 MHz and the fifth 1.25 MHz appear respectively (if the frequency hopping strategy is adopted, the locations are initial locations), and the serial numbers of the two locations in the frequency domain are 0 and 1 according to the method of the present invention. Random access channel A is broadcast in a system message first and then random access channel B. According to the method of the present invention, the relative locations of A and B are 0 and 1 respectively.

The group identifier in method 1 is the combination of location of a random access time slot in a radio frame (shortened as location T) and the location thereof in the frequency domain (shortened as location F). A method of combining can be general indexing, or coding respectively and then combining. For example, suppose that there are 10 possibilities for location T in a certain cell while there are 3 possibilities for location F. The method of general indexing means that there are a total of 30 possibilities for the group identifier, accordingly, a 5-bit information field suffices to index the possibilities. The method of combining is to adopt 4 bits to denote location T, to adopt 2 bits to denote location F, and to combine the location T and location F to generate a group identifier, in other words, the group identifier requires 6 bits. The order of location T and location F in the group identifier information in the two methods will not change the essence of the group identifier, so it is applicable whichever is arranged first. Generally, however, after the defining of a frame structure is finished, there is an upper limit for location T whether it be a relative location or an absolute location, i.e., the maximum number of subframes or time slots probably used as random access time slots in a frame structure is fixed, while location F changes with the cell carrier bandwidth. So it seems more reasonable to put information coding of location F at the higher bit of a group identifier coding.

No matter which frame structure and random access time slot configuration manner are adopted in LTE, the random access procedure comprises the above 3 steps. In order to illustrate methods of implementing the present invention, the methods for mapping RA-RNTI in a radio frame to location of each random access times slot in a located radio frame in which each random access time slot is located are illustrated hereinafter, according to different radio frame structures and random access time slot configurations. In terms of an extended pulse, the absolute location is subject to the number of the first subframe or time slot occupied by the extended pulse. RA-RNTI is shown in the embodiments by adopting relative location representation and absolute location representation respectively.

The present invention will be further described with reference to the applied embodiments hereinafter.

Method 1 for generating a group identifier will be illustrated first:

For the convenience of description, it is assumed that at most 4 random access channels can be configured in LTE. In the embodiments, 2 random access channels are adopted. The location in the frequency domain in a group identifier (shortened as location F) has 2 bits, which only adopts the values of 0 and 1. In addition, the location of a random access time slot in a radio frame (shortened as location T) is represented by 4 bits. The group identifier is generated by combining the two locations above, and the location in the frequency domain is located at the higher bits. RA-RNTI can be computed according to the two methods for valuing location T respectively.

Embodiment 01

TYPE1 frame structure, applied in FDD, the period of a random access time slot is 10 ms or more than 10 ms, e.g. 20 ms
  the relative serial number of location T=0
  when F is 00, the binary code of the group identifier that is identified by combining T and F is 000000, and the corresponding decimal code is 0; when F is 01, the binary code of the group identifier that is identified by combining T and F is 010000, and the corresponding decimal code is 16, therefore,
  RA-RNTI=0, 16
  the absolute number of location T=the number of the subframe in which the random access time slot is located, e.g. 0 or 5 or 9
  RA-RNTI=0, 16 (the corresponding absolute number of T is 0, F is 00 or 01) or
  RA-RNTI=5, 21 (the corresponding absolute number of T is 5, F is 00 or 01), or
  RA-RNTI=9, 25 (the corresponding absolute number of T is 9, F is 00 or 01).

Embodiment 02

TYPE1 frame structure, applied in FDD, the period of a random access time slot is 5 ms
  the relative serial number of location T=0, 1
  RA-RNTI=0, 1, 16, 17
  the absolute number of location T=the number of the subframe in which the random access time slot is located, e.g. (0, 5) or (1, 6) or (2, 7) or (3, 8) or (4, 9)
  RA-RNTI=(0, 5, 16, 21) or (1, 6, 17, 22) or (2, 7, 18, 23) or (3, 8, 19, 24) or (4, 9, 20, 25).

Embodiment 03

TYPE1 frame structure, applied in FDD, the period of a random access time slot is 1 ms
  the relative serial number of location T=0, 1, 2, 3, 4, 5, 6, 7, 8, 9
  RA-RNTI=0-9, 16-25
  the absolute number of location T=0, 1, 2, 3, 4, 5, 6, 7, 8, 9
  RA-RNTI=0-9, 16~25.

Embodiment 04

TYPE1 frame structure, applied in FDD, the period of a random access time slot is 10 ms or more than 10 ms, e.g. 20 ms, and an extended pulse occupies 2 subframes
  the relative serial number of location T=0
  RA-RNTI=0, 1
  the absolute number of location T=the number of the subframe in which the random access time slot is located, e.g. 0, 5, 8, etc.
  RA-RNTI=(0, 16) or (5, 21) or (8, 24), etc.

Embodiment 05

TYPE1 frame structure, applied in FDD, the period of a random access time slot is 10 ms or more than 10 ms, e.g. 20 ms, and an extended pulse occupies 3 subframes
  the relative serial number of location T=0
  RA-RNTI=0, 1
  the absolute number of location T=the number of the subframe in which the random access time slot is located, e.g. 0, 3, 6, etc.
  RA-RNTI=(0, 16) or (3, 19) or (6, 22), etc.

Figure 5:
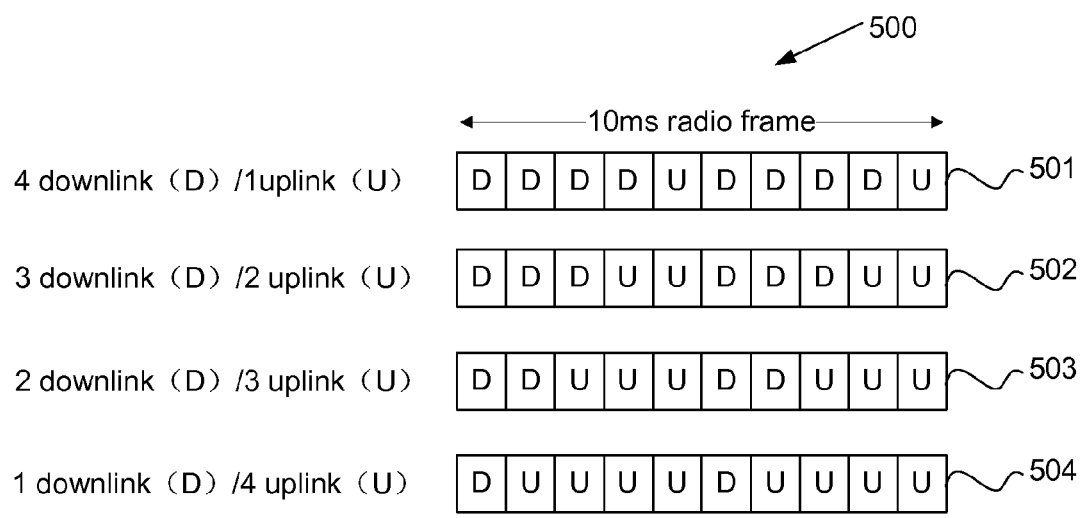
FIG. 5 is a diagram illustrating the allocation 500 of HCR TDD in uplink and downlink time slots in the existing technology.

The allocation of uplink/downlink time slots in HCR TDD in LTE is shown in FIG. 5, including four modes shown as 501, 502, 503 and 504.

Embodiment 06

TYPE1 frame structure, applied in HCR TDD, the period of a random access time slot is 10 ms or more than 10 ms, e.g. 20 ms
  the relative serial number of location T=0
  RA-RNTI=0, 1
  the absolute number of location T=the number of the subframe in which the random access time slot is located, e.g. 1 or 4 or 9, etc.
  RA-RNTI=(1, 17) or (4, 20) or (9, 25).

Embodiment 07

TYPE1 frame structure, applied in HCR TDD, the period of a random access time slot is 5 ms
  the relative serial number of location T=0, 1
  RA-RNTI=0, 1, 16, 17
  the absolute number of location T=the number of the subframe in which the random access time slot is located, (1, 6) or (2, 7) or (3, 8) or (4, 9)
  RA-RNTI=(1, 6, 17, 22) or (2, 7, 18, 23) or (3, 8, 19, 24) or (4, 9, 20, 25).

Embodiment 08

TYPE1 frame structure, applied in HCR TDD, the period of a random access time slot is 10 ms or 20 ms, and an extended pulse occupies 3 time slots
  the relative serial number of location T=0
  RA-RNTI=0, 1
  the absolute number of location T=the number of the subframe in which the random access time slot is located, e.g. 1 or 2 or 6 or 7, etc.
  RA-RNTI=(1, 17) or (2, 18) or (6, 22) or (7, 23).

Embodiment 09

TYPE1 frame structure, applied in HCR TDD, the period of a random access time slot is 10 ms or more than 10 ms, e.g. 20 ms, and an extended pulse occupies 2 time slots the relative serial number of location T=0
RA-RNTI=0, 1
the absolute number of location T=the number of the subframe in which the random access time slot is located, e.g. 1 or 3 or 8, etc.
RA-RNTI=(1, 17) or (3, 19) or (8, 24).

The requirement of the allocation of uplink/downlink time slots of LCR TDD in LTE is that: in each half-frame, the time slot numbered 0 is a downlink time slot; and the time slots from number 1 are continuous uplink time slots; if the number of the uplink time slots is less than 6, the rest of the time slots are continuous downlink time slots; the allocation of uplink time slots and downlink time slots is changeable. Additionally, in order to unify the number, a number of a time slot in the second half-frame is converted to 7+the number of the time slot, for example, the time slot numbered 0 in the second half-frame is numbered 7, and the rest can be done in the same manner. If short pulses are adopted, the absolute numbers can be beyond the existing numbers of the time slots in the frame, for example, a number of a short pulse in the first half-frame can be 0, while a number of a short pulse in the second half-frame can be 7. Such numbering manner does not change the relative serial numbers of the time slots in the time domain nor those among other time slots.

Embodiment 10

TYPE2 frame structure, applied in LCR TDD, the period of a random access time slot is 10 ms or more than 10 ms, e.g. 20 ms the relative serial number of location T=0
RA-RNTI=0, 1
the absolute number of location T=the number of the time slot in which the random access time slot is located, e.g. 1 or 8 or 10
RA-RNTI=(1, 17) or (8, 24) or (10, 26).

Embodiment 11

TYPE2 frame structure, applied in LCR TDD, the period of a random access time slot is 5 ms the relative serial number of location T=0, 1
RA-RNTI=0, 1, 16, 17
the absolute number of location T=the number of the time slot in which the random access time slot is located, e.g. (1, 8) or (2, 9) or (4, 11) or (6, 13), etc.
RA-RNTI=(1, 8, 17, 24) or (2, 9, 18, 25) or (4, 11, 20, 27) or (6, 13, 22, 29).

Embodiment 12

TYPE2 frame structure, applied in LCR TDD, the period of a random access time slot is 10 ms or more than 10 ms, e.g. 20 ms, short pulse the relative serial number of location T=0
RA-RNTI=0, 1
the absolute number of location T=the number of the time slot in which the random access time slot is located, e.g. 0 or 7, etc.
RA-RNTI=(0, 16) or (7, 23).

Embodiment 13

TYPE2 frame structure, applied in LCR TDD, the period of a random access time slot is 10 ms or more than 10 ms, e.g. 20 ms, and an extended pulse occupies 2 time slots the relative serial number of location T=0
RA-RNTI=0, 1
the absolute number of location T=the number of the time slot in which the random access time slot is located, e.g. 1 or 4 or 12, etc.
RA-RNTI=(1, 17) or (4, 20) or (12, 28), etc.

Embodiment 14

TYPE2 frame structure, applied in LCR TDD, the period of a random access time slot is 10 ms or more than 10 ms, e.g. 20 ms, and an extended pulse occupies 3 time slots the relative serial number of location T=0
RA-RNTI=0, 1
the absolute number of location T=the number of the time slot in which the random access time slot is located, e.g. 1 or 2 or 11, etc.
RA-RNTI=(1, 17) or (2, 18) or (11, 27).

In the following applied embodiments, a general indexing method is adopted to illustrate the method for generating a group identifier in method 1:

Embodiment 15

TYPE1 frame structure, applied in FDD, one random access channel is configured, and the period of a random access time slot is 10 ms the absolute number of location T=the number of the subframe in which the random access time slot is located, i.e. 0-9
the number of location F=0
RA-RNTI=0-9;

Embodiment 16

TYPE1 frame structure, applied in FDD, 2 random access channels are configured, and the period of a random access time slot is 10 ms the absolute number of location T=the number of the subframe in which the random access time slot is located, e.g. 1, 4, 7
the number of location F=0 and 1
RA-RNTI=(1, 4, 7) and (11, 14, 17).

Method 2 for generating a group identifier will be illustrated hereinafter:

Embodiment 17

TYPE1 frame structure, applied in FDD, the period of a random access time slot is 10 ms or more than 10 ms, e.g. 20 ms;

the relative location: RA-RNTI=0
the absolute location: RA-RNTI=the number of the subframe in which the random access time slot is located, e.g. 0 or 5 or 9;

Embodiment 18

TYPE1 frame structure, applied in FDD, the period of a random access time slot is 5 ms;
the relative location: RA-RNTI=0, 1 the absolute location: RA-RNTI=the number of the subframe in which the random access time slot is located, e.g. (0, 5) or (1, 6) or (2, 7) or (3, 8) or (4, 9);

Embodiment 19

TYPE1 frame structure, applied in FDD, the period of a random access time slot is 1 ms
the relative location: RA-RNTI=0, 1, 2, 3, 4, 5, 6, 7, 8, 9
the absolute location: RA-RNTI=0, 1, 2, 3, 4, 5, 6, 7, 8, 9;

Embodiment 20

TYPE1 frame structure, applied in FDD, the period of a random access time slot is 10 ms or more than 10 ms, e.g. 20 ms, and an extended pulse occupies 2 subframes
the relative location: RA-RNTI=0
the absolute location: RA-RNTI=the number of the subframe in which the random access time slot is located, e.g. 0, 5, 8, etc.

Embodiment 21

TYPE1 frame structure, applied in FDD, the period of a random access time slot is 10 ms or more than 10 ms, e.g. 20 ms, and an extended pulse occupies 3 subframes
the relative location: RA-RNTI=0
the absolute location: RA-RNTI=the number of the subframe in which the random access time slot is located, e.g. 0, 3, 6, etc.
The allocation of uplink/downlink time slots in HCR TDD in LTE is shown in FIG. 5.

Embodiment 22

TYPE1 frame structure, applied in HCR TDD, the period of a random access time slot is 10 ms or more than 10 ms, e.g. 20 ms
the relative location: RA-RNTI=0
the absolute location: RA-RNTI=the number of the subframe in which the random access time slot is located, e.g. 1, 4 or 9, etc.

Embodiment 23

TYPE1 frame structure, applied in HCR TDD, the period of a random access time slot is 5 ms
the relative location: RA-RNTI=0, 1
the absolute location: RA-RNTI=the number of the subframe in which the random access time slot is located, e.g. (1, 6) or (2, 7) or (3, 8) or (4, 9).

Embodiment 24

TYPE1 frame structure, applied in HCR TDD, the period of a random access time slot is 10 ms or 20 ms, and an extended pulses occupies 3 time slots
the relative location: RA-RNTI=0
the absolute location: RA-RNTI=the number of the subframe in which the random access time slot is located, e.g. 1, 2, 6 or 7, etc.

Embodiment 25

TYPE1 frame structure, applied in HCR TDD, the period of a random access time slot is 10 ms or more than 10 ms, e.g. 20 ms, and an extended pulses occupies 2 time slots
the relative location: RA-RNTI=0
the absolute location: RA-RNTI=the number of the subframe in which the random access time slot is located, e.g. 1, 3 or 8, etc.

For the allocation of uplink/downlink time slots in LCR TDD in LTE, it is required that: in each half-frame, the time slot numbered 0 is a downlink time slot; and the time slots from number 1 are continuous uplink time slots; if the number of the uplink time slots is less than 6, the rest of the time slots are continuous downlink time slots; the allocation of uplink time slots and downlink time slots is changeable. Additionally, in order to unify the number, a number of a time slot in the second half-frame is converted to 7+the number of the time slot, for example, the time slot numbered 0 in the second half-frame is numbered 7, and the rest can be done in the same manner. If short pulses are adopted, the absolute numbers can borrow the previous numbers of the downlink time slots, for example, a number of a short pulse in the first half-frame can be 0, while a number of a short pulse in the second half-frame can be 7.

Embodiment 26

TYPE2 frame structure, applied in LCR TDD, the period of a random access time slot is 10 ms or more than 10 ms, e.g. 20 ms
the relative location: RA-RNTI=0
the absolute location: RA-RNTI=the number of the time slot in which the random access time slot is located, e.g. 1, 8 or 10.

Embodiment 27

TYPE2 frame structure, applied in LCR TDD, the period of a random access time slot is 5 ms
the relative location: RA-RNTI=0, 1
the absolute location: RA-RNTI=the number of the time slot in which the random access time slot is located, e.g. (1, 8) or (2, 9) or (4, 11) or (6, 13), etc.

Embodiment 28

TYPE2 frame structure, applied in LCR TDD, the period of a random access time slot is 10 ms or more than 10 ms, e.g. 20 ms, short pulse
the relative location: RA-RNTI=0
the absolute location: RA-RNTI=the number of the time slot in which the random access time slot is located, e.g. 0 or 7, etc.

Embodiment 29

TYPE2 frame structure, applied in LCR TDD, the period of a random access time slot is 10 ms or more than 10 ms, e.g. 20 ms, and an extended pulse occupies 2 time slots
the relative location: RA-RNTI=0
the absolute location: RA-RNTI=the number of the time slot in which the random access time slot is located, e.g. 1, 4 or 12, etc.

Embodiment 30

TYPE2 frame structure, applied in LCR TDD, the period of a random access time slot is 10 ms or more than 10 ms, e.g. 20 ms, and an extended pulse occupies 3 time slots
the relative location: RA-RNTI=0
the absolute location: RA-RNTI=the number of the time slot in which the random access time slot is located, e.g. 1, 2 or 11, etc.

The present invention certainly further comprises many other embodiments, and to those skilled in the art, various modifications and changes can be made without departing from the spirit and the essence of the present invention, any of which should be included within the protection scope of the present invention, as defined by the claims.

INDUSTRIAL APPLICABILITY

Before starting a random access, a terminal always knows the configuration of random access time slots in the time domain (i.e. in a radio frame) and that in the frequency domain according to description information of the obtained random access radio resources. By adopting the present invention, a group identifier in a random access response message can be determined without depending upon the reading of an SFN, which is very important for the random access procedure during the switching procedure. In addition, it allows simple and easy operation to set a group identifier in the same way whether the configuration of a random access time slot changes or not.

What is claimed is:

1. A terminal random access method for a cellular radio communications system, comprising the following steps:
    a terminal already knowing a usable random access time slot, and combining location information of the random access time slot in a radio frame and that in the frequency domain to generate an expected group identifier;
    the terminal sending a random access preamble message to a base station in the random access time slot in the radio frame;
    the base station combining location information of the random access time slot in the radio frame and that in the frequency domain to generate a group identifier, and after adding the group identifier and an individual identifier that corresponding to the random access preamble message to a random access response message, sending the random access response message to the terminal; and
    the terminal determining whether the random access response message that corresponding to the sent random access preamble is received, by determining whether the group identifier in the received random access response message is the expected group identifier, and whether the individual identifier in the received random access response message is an expected value of the individual identifier,
    wherein the expected value of the individual identifier is the identification number of the random access preamble sent by the terminal.

2. The method according to claim 1, wherein:
    the uplink radio resource is comprised in the random access response message allocated for the terminal by the base station.

3. The method according to claim 1, wherein:
    the base station combining the location information of the random access time slot in the radio frame and that in a frequency domain comprises:
    generally indexing the location information of the random access time slot in the radio frame and that in the frequency domain; or
    coding the location information of the random access time slot in the radio frame and that in the frequency domain respectively, and then combining the coded location information of the random access time slot in the radio frame and the coded location information of the random access time slot in the frequency domain.

4. The method according to claim 3, wherein:
    the location information of the random access time slot in the frequency domain is located at the high bit of the coding of the group identifier.

5. The method according to claim 3, wherein:
    when the location information of the random access time slot in the radio frame is a relative location, the relative location is a serial number of the random access time slot among all random access time slots configured in the radio frame; and
    when the location information of the random access time slot in the radio frame is an absolute location, the absolute location is a number of a subframe, in which the random access time slot is located, in the radio frame.

6. The method according to claim 3, wherein:
    the location information of the random access time slot in the frequency domain is a relative location of a random access channel in the frequency domain: when just one random access channel is configured in a cell, setting the location of the random access time slot in the frequency domain to be 0; when a plurality of random access channels are configured in a cell, and a frequency hopping strategy is not adopted, setting the relative locations of the random access channels in the frequency domain to be the serial numbers in ascending or descending order of frequency bands occupied by different random access channels within current cell carrier bandwidth; when the frequency hopping strategy is adopted, setting the relative locations of the random access channels in the frequency domain to be serial numbers in ascending or descending order of the frequency bands occupied by initial locations of the random access channels in frequency-domain within current cell carrier bandwidth.

7. The method according to claim 3, wherein:
    the location information of the random access time slot in the frequency domain is the order of the appearance of random access channels in a signaling.

8. A terminal random access method for a cellular radio communications system, comprising the following steps:
    a terminal already knowing a usable random access time slot, and taking location information of the random access time slot in a radio frame to as an expected group identifier;
    the terminal sending a random access preamble message to a base station in the random access time slot in the radio frame;
    the base station taking the location information of the random access time slot in the radio frame as a group identifier, adding the group identifier together with an individual identifier that corresponding to the random access preamble message to a random access response message, and sending the random access response message to the terminal; and
    the terminal determining whether the random access response message corresponding to the sent random access preamble is received, by determining whether the group identifier in the received random access response message is the expected group identifier, and whether the individual identifier in the received random access response message is an expected value of the individual identifier,
    wherein the expected value of the individual identifier is the identification number of the random access preamble sent by the terminal.

9. The method according to claim 8, wherein:
    uplink radio resources are comprised in the random access response message allocated for the terminal by the base station.

10. The method according to claim 8, wherein:

when the location information of the random access time slot in the radio frame is a relative location, the relative location is a serial number of the random access time slot among all random access time slots configured in the radio frame; and when the location information of the random access time slot in the radio frame is an absolute location, the absolute location is a number of a subframe, in which the random access time slot is located, in the radio frame.

11. A method for generating a group identifier, applied in the procedure of a terminal randomly accessing to a cellular radio communications system, comprising the following steps:

after receiving a random access preamble message sent by a terminal, a base station determining location information of the random access time slot, in which the random access preamble message is sent, in a radio frame and location information of the random access time slot in a frequency domain; and the base station combining the location information of the random access time slot in which the random access preamble message being located in the radio frame and the location information of the random access time slot in the frequency domain to generate a group identifier.

12. The method according to claim 11, wherein:

combining the location information of the random access time slot in the radio frame and the location information of the random access time slot in the frequency domain comprises:

generally indexing the location information of the random access time slot in the radio frame and the location information of the random access time slot in the frequency domain; or coding the location information of the random access time slot in the radio frame and the location information of the random access time slot in the frequency domain respectively, and then combining the coded location information of the random access time slot in the radio frame and the coded location information of the random access time slot in the frequency domain.

13. The method according to claim 12, wherein:

the location information of the random access time slot in the frequency domain is located at the high bit of the coding of the group identifier.

14. The method according to claim 12, wherein:

when the location information of the random access time slot in the radio frame is a relative location, the relative location is a serial number of the random access time slot among all one or more random access time slots in the radio frame; and when the location information of the random access time slot in the radio frame is an absolute location, the absolute location is a number of a subframe, in which the random access time slot is located, in the radio frame.

15. The method according to claim 12, wherein:

the location of the random access time slot in the frequency domain is a relative location of a random access channel in the frequency domain: when just one random access channel is configured in a cell, setting the location of the random access time slot in the frequency domain to be 0; when a plurality of random access channels are configured in a cell, and a frequency hopping strategy is not adopted, setting the relative locations of the random access channels in the frequency domain to be the serial numbers in ascending or descending order of frequency bands occupied by different random access channels within current cell carrier bandwidth; when the frequency hopping strategy is adopted, setting the relative locations of the random access channels in the frequency domain to be the serial numbers in ascending or descending order of the frequency bands occupied by initial locations of the random access channels in frequency-domain within current cell carrier bandwidth.

16. The method according to claim 12, wherein:

the location information of the random access time slot in the frequency domain is the order of the appearance of random access channels in a signaling.

\* \* \* \* \*